United States Patent
Mujtaba

(10) Patent No.: US 7,558,328 B2
(45) Date of Patent: Jul. 7, 2009

(54) METHOD AND APPARATUS FOR INCREASING DATA THROUGHPUT IN A MULTIPLE ANTENNA COMMUNICATION SYSTEM USING ADDITIONAL SUBCARRIERS

(75) Inventor: Syed Aon Mujtaba, Watchung, NJ (US)

(73) Assignee: Agere Systems Inc., Allentown, PA (US)

( * ) Notice: Subject to any disclaimer, the term of this patent is extended or adjusted under 35 U.S.C. 154(b) by 687 days.

(21) Appl. No.: 11/223,757

(22) Filed: Sep. 9, 2005

(65) Prior Publication Data
US 2006/0067415 A1    Mar. 30, 2006

Related U.S. Application Data

(60) Provisional application No. 60/608,472, filed on Sep. 9, 2004.

(51) Int. Cl.
*H04L 27/28* (2006.01)
*H04B 7/02* (2006.01)

(52) U.S. Cl. ...................... 375/260; 375/267

(58) Field of Classification Search ............. 375/260, 375/267, 299, 346, 347; 370/208, 210, 344, 370/338
See application file for complete search history.

(56) References Cited

U.S. PATENT DOCUMENTS

| | | | |
|---|---|---|---|
| 2004/0047285 A1* | 3/2004 | Foerster et al. | 370/210 |
| 2004/0081131 A1* | 4/2004 | Walton et al. | 370/344 |
| 2004/0151109 A1* | 8/2004 | Batra et al. | 370/208 |
| 2005/0190868 A1* | 9/2005 | Khandekar et al. | 375/346 |
| 2005/0232208 A1* | 10/2005 | Hansen | 370/338 |
| 2005/0249174 A1* | 11/2005 | Lundby et al. | 370/338 |
| 2005/0281241 A1* | 12/2005 | Webster et al. | 370/343 |

\* cited by examiner

*Primary Examiner*—Don N Vo
(74) *Attorney, Agent, or Firm*—Ryan, Mason & Lewis, LLP

(57) ABSTRACT

Methods and apparatus are provided for increasing data throughput in a multiple antenna communication system using additional subcarriers. The multiple antenna communication system includes at least one legacy system employing an $N_1$ point fast Fourier transform (FFT) within a bandwidth, $BW_1$. Data is transmitted using an $N_2$ point inverse FFT within the bandwidth, $BW_1$, wherein $N_2$ is greater than $N_1$; and subcarriers associated with the $N_2$ point inverse FFT are employed to transmit the data. Data can also be transmitted using an $N_2$ point inverse FFT within a bandwidth, $BW_2$, wherein $N_2$ is greater than $N_1$ and the bandwidth, $BW_2$, is greater than the bandwidth, $BW_1$; and subcarriers associated with the $N_2$ point inverse FFT are employed to transmit the data, wherein the employed subcarriers includes one or more additional subcarriers at outer edges of the bandwidth, $BW_1$, relative to the legacy system and one or more additional subcarriers near DC relative to the legacy system.

20 Claims, 5 Drawing Sheets

METHOD AND APPARATUS FOR INCREASING DATA THROUGHPUT IN A MULTIPLE ANTENNA COMMUNICATION SYSTEM USING ADDITIONAL SUBCARRIERS

CROSS-REFERENCE TO RELATED APPLICATIONS

The present application claims priority to U.S. Provisional Patent Application Ser. No. 60/608,472, filed Sep. 9, 2004, incorporated by reference herein.

FIELD OF THE INVENTION

The present invention relates generally to multiple antenna wireless communication systems, and more particularly, to techniques for transmitting data on subcarriers in a multiple antenna communication system.

BACKGROUND OF THE INVENTION

Multiple transmit and receive antennas have been proposed to provide both increased robustness and capacity in next generation Wireless Local Area Network (WLAN) systems. The increased robustness can be achieved through techniques that exploit the spatial diversity and additional gain introduced in a system with multiple antennas. The increased capacity can be achieved in multipath fading environments with bandwidth efficient Multiple Input Multiple Output (MIMO) techniques. A multiple antenna communication system increases the data rate in a given channel bandwidth by transmitting separate data streams on multiple transmit antennas.

In the current IEEE 802.11a/g standard, for example, each channel is 20 MHz wide and there are 64 possible subcarriers within each 20 MHz channel. Of the 64 possible subcarriers, however, only 48 tones are employed to carry data in the 802.11 standard. It is noted that twelve tones are not used at all, including one blank tone at DC (0 MHz), and four pilot tones are employed that do not carry any user information. Thus, only 75 percent of the available subcarriers are employed to carry user data.

A number of techniques have been proposed or suggested for further increasing the data throughput in multiple antenna communication systems. For example, a channel bonding technique has been proposed that increases the channel bandwidth to 40 MHz and the number of subcarriers to 128. When the 802.11a standard is extended in such a two-fold manner to provide a 40 MHz channel bandwidth, it would likewise be expected to double the number of subcarriers that are employed to carry user information from 48 to 96 subcarriers. A need exists, however, for an ever greater improvement in efficiency and throughput. A further need exists for methods and apparatus for increasing throughput in a multiple antenna communication system using additional subcarriers.

SUMMARY OF THE INVENTION

Generally, methods and apparatus are provided for increasing data throughput in a multiple antenna communication system using additional subcarriers. The multiple antenna communication system includes at least one legacy system employing an $N_1$ point fast Fourier transform (FFT) within a bandwidth, $BW_1$. According to one aspect of the invention, data is transmitted using an $N_2$ point inverse FFT within the bandwidth, $BW_1$, wherein $N_2$ is greater than $N_1$; and subcarriers associated with the $N_2$ point inverse FFT are employed to transmit the data. Additional subcarriers, relative to the legacy system, can be employed at outer edges of the bandwidth, $BW_1$, or near DC. For example, $N_1$ can be a 64 point inverse FFT within the bandwidth, $BW_1$, equal to 20 MHz, and $N_2$ can be a 128 point inverse FFT within the bandwidth, $BW_1$.

According to another aspect of the invention, data is transmitted using an $N_2$ point inverse FFT within a bandwidth, $BW_2$, wherein $N_2$ is greater than $N_1$ and the bandwidth, $BW_2$, is greater than the bandwidth, $BW_1$; and subcarriers associated with the $N_2$ point inverse FFT are employed to transmit the data, wherein the employed subcarriers includes one or more additional subcarriers at outer edges of the bandwidth, $BW_1$, relative to the legacy system and one or more additional subcarriers near DC relative to the legacy system. For example, $N_1$ can be a 64 point inverse FFT within the bandwidth, $BW_1$, equal to 20 MHz, and $N_2$ can be a 128 point inverse FFT within the bandwidth, $BW_2$, equal to 40 MHz.

A more complete understanding of the present invention, as well as further features and advantages of the present invention, will be obtained by reference to the following detailed description and drawings.

DETAILED DESCRIPTION

According to one aspect of the present invention, the total number of possible subcarriers used in 40 MHz is increased to 128 or 256 subcarriers. An implementation in accordance with the present invention optionally includes both 128 subcarriers and 256 subcarriers and leaves the choice to vendors or network managers. According to another aspect of the present invention, a transmission scheme is provided to increase the system throughput by increasing the number of subcarriers that are user to carry user information.

Figure 1:
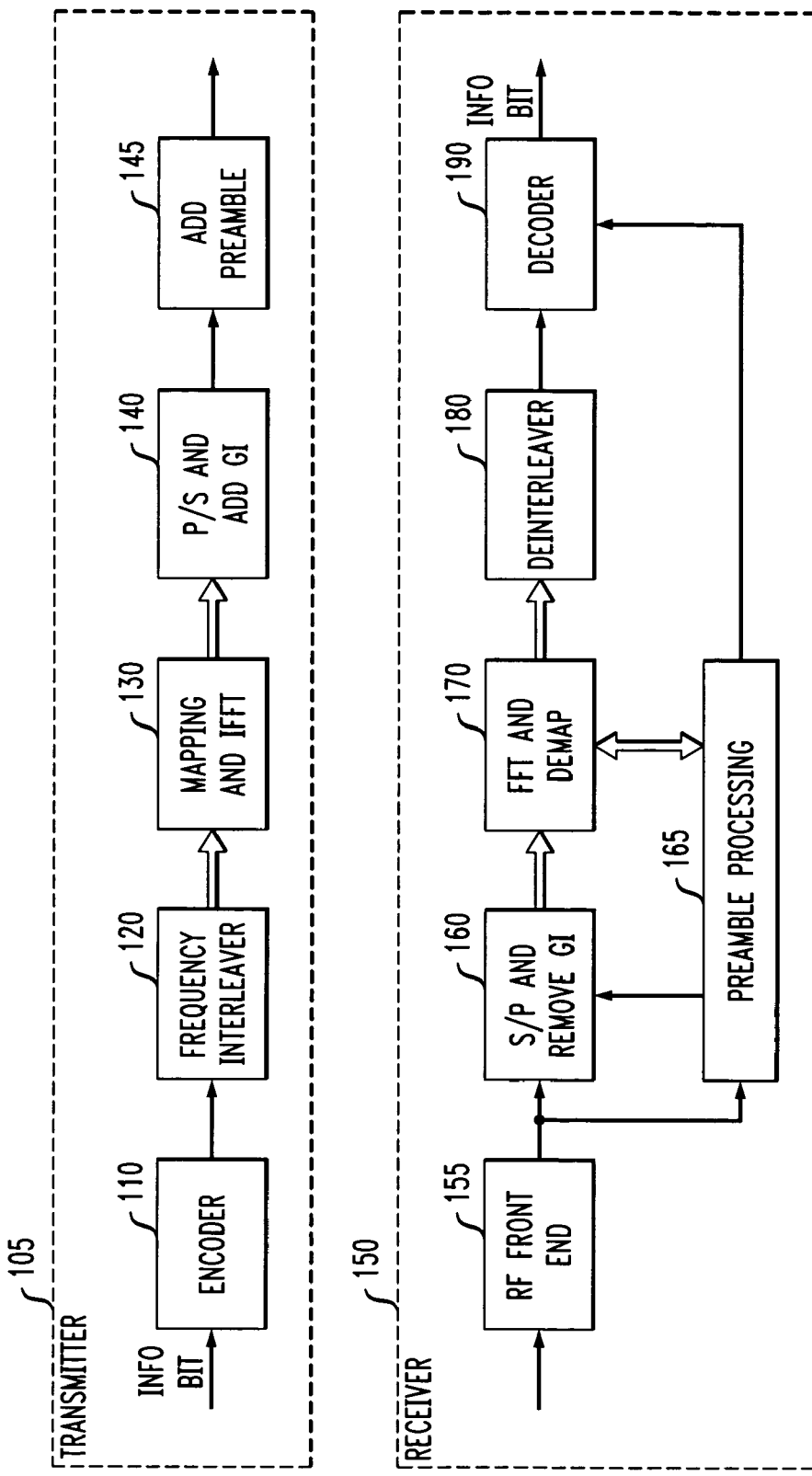
FIG. 1 is a schematic block diagram of a conventional 802.11a/g transceiver.

FIG. 1 is a schematic block diagram of a conventional 802.11a/g transceiver 100. At the transmitter side 105, the information bits are first encoded at stage 110 and then frequency interleaved at stage 120. The encoded and interleaved bits are then mapped onto subcarriers (tones) at stage 130 and form a frequency domain OFDM signal. The frequency domain OFDM signal is translated to the time domain by an inverse Fourier transform (IFFT) during stage 130. At stage 140, the data is serialized and a guard interval is added to each OFDM symbol. Finally, a preamble including training and signal fields is added during stage 145 at the beginning of each packet.

At the receiver side 150, the received signal is initially processed by the RF front end 155, and then the serial data is parallelized and the guard interval is removed at stage 160. The time domain signal is translated to the frequency domain using an FFT 170 and the subcarriers are demapped to encoded and interleaved bits. Meanwhile, the preamble is processed at stage 165. The interleaved bits are deinterleaved at stage 180 and decoded at stage 190 to provide the transmitted information bits.

Figure 2:
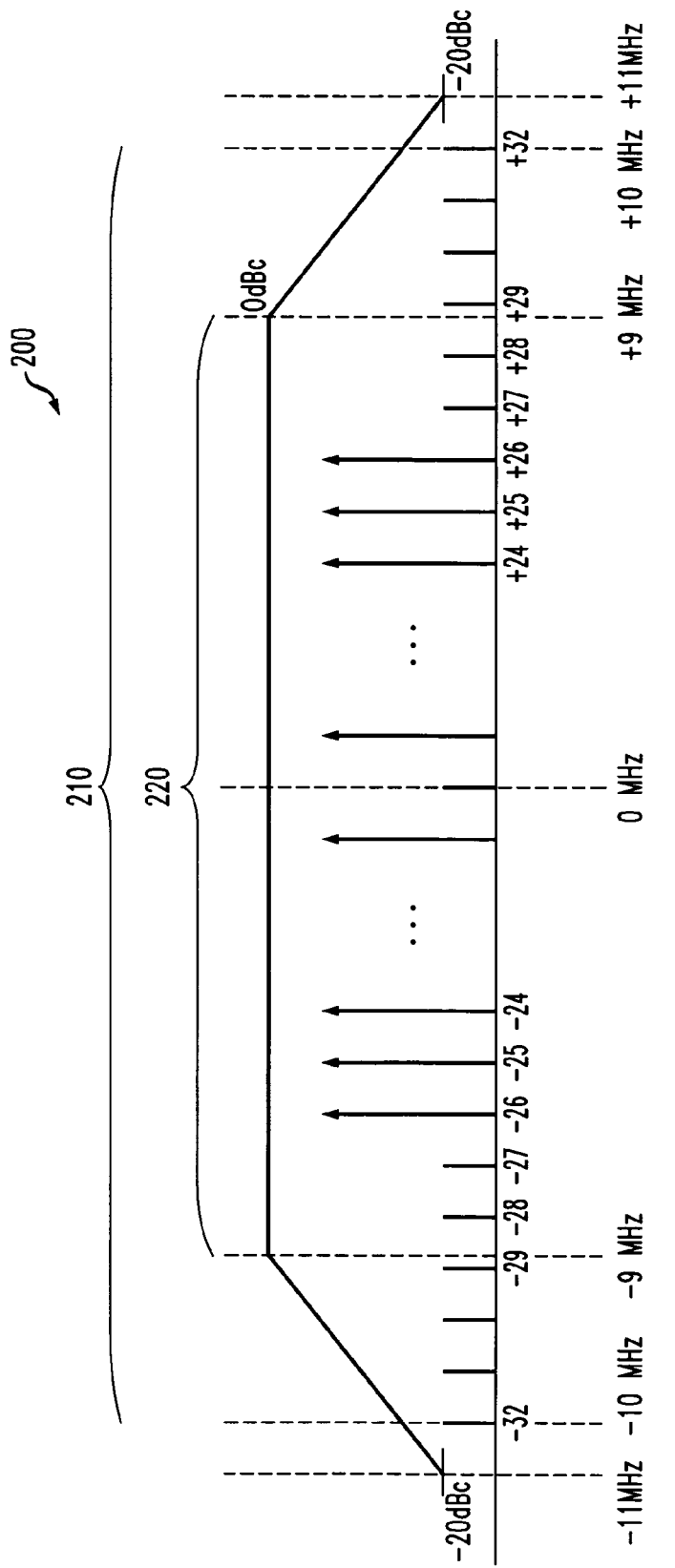
FIG. 2 illustrates the current subcarrier design in accordance with the IEEE 802.11a standard.

FIG. 2 illustrates the current subcarrier design 200 in accordance with the IEEE 802.11a standard. As shown in FIG. 2, each 20 MHz channel 210 has 64 possible subcarriers, −32 through +32, with each subcarrier having a bandwidth of 312.5 kHz. The channel 210 includes a "flat" passband region 220. 52 subcarriers, −26 through +26, are actually employed by the IEEE 802.11a standard, as indicated in FIG. 2 by the arrow at each subcarrier, including four (4) subcarriers that are utilized as pilot tones (the pilot tones do not carry user information). Thus, subcarriers −27 through −32 and +27 through +32, as well as one blank subcarrier at DC (0 MHz), are not employed in the 802.11a standard. Generally, subcarriers −27 through −32 and +27 through +32 were blanked out to ease the filter design.

If the subcarrier design of FIG. 2 were extended to a 128 point FFT within the same 20 MHz spectral mask of the 802.11a standard, having 128 subcarriers, for example, it would be expected that 104 subcarriers, −52 through +52, would actually be employed, including eight (8) subcarriers as pilot tones.

Figure 3:
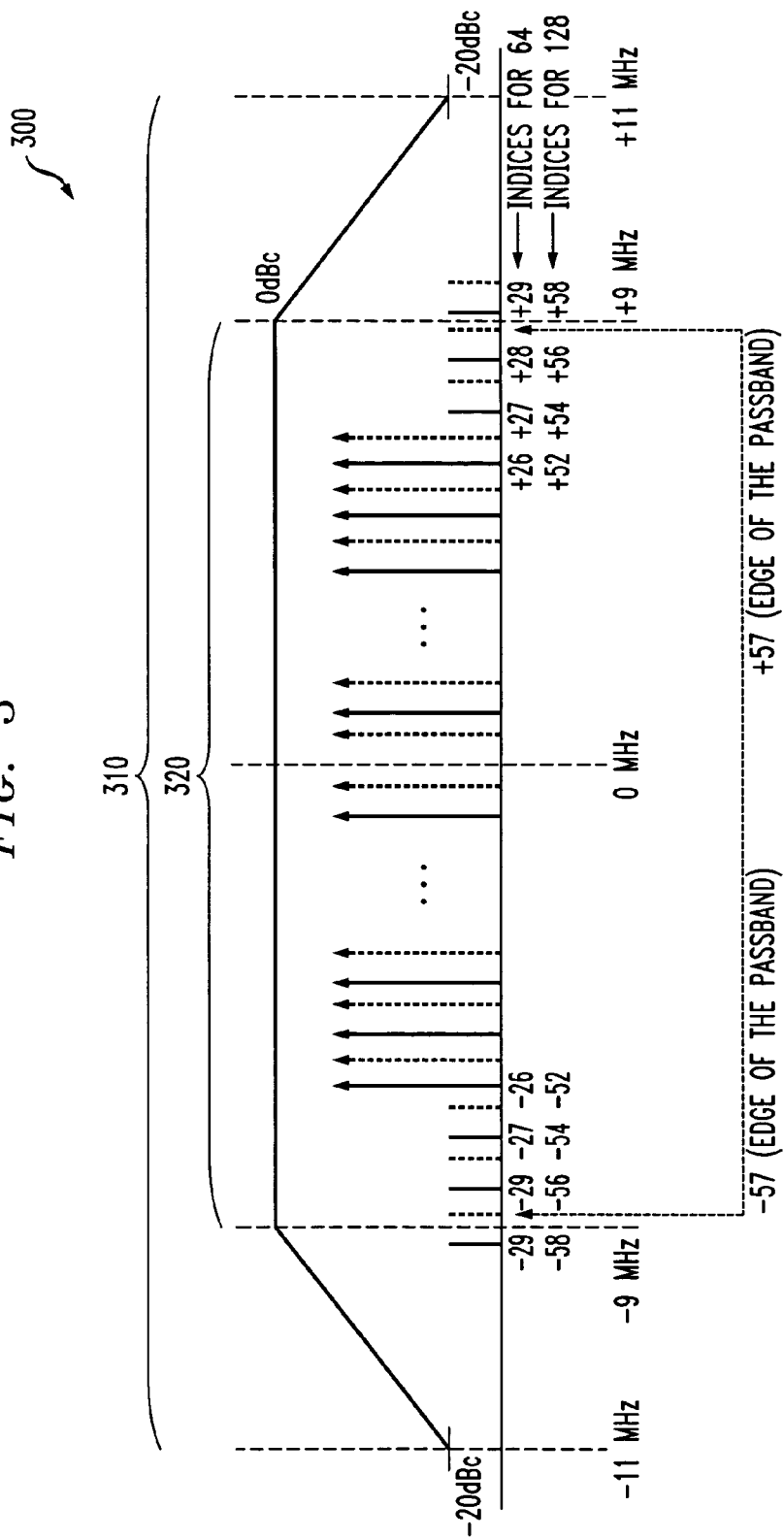
FIG. 3 illustrates a subcarrier design in accordance with the present invention.

According to one aspect of the present invention, however, a transmission scheme is provided to increase the system throughput by increasing the number of subcarriers that are used to carry user information. FIG. 3 illustrates a subcarrier design 300 in accordance with the present invention. In the exemplary design 300 shown in FIG. 3, a 128 point FFT is employed in each 20 MHz channel 310, where the FFT samples the spectrum at twice the rate of the configuration shown in FIG. 2 (64 point FFT). The symbol time for 128 point FFT in 20 MHz is 2×3.2 us (6.4 us).

A transceiver 100 in accordance with the present invention increases the number of subcarriers that are used to carry user information, relative to an IEEE 802.11a implementation. In one exemplary implementation of the present invention, all the available subcarriers in the "flat" passband region 320 from −9 MHz to +9 MHz are employed to carry user information or to serve as a pilot tone. In this manner, all "tone indices" between −57 to +57 on a 128 FFT scale are used (i.e., a total of 114 tones out of 128 tones in the 20 MHz channel). If the number of pilot tones is maintained at four (4), which is sufficient in 20 MHz, 110 tones can be employed to carry user information. The DC tone, and optionally additional tones adjacent to the DC tone, are nulled, in a known manner. Thus, 110 tones are available for data transport (assuming one null tone). In this manner, the efficiency of the OFDM symbol can be increased from 60% to 76%, as discussed further below in conjunction with FIG. 5.

In an exemplary implementation where 64-QAM encoding is employed by the transceiver 100 with 6 coded bits/tone, 4.5 information bits are carried per tone, with a rate, R, equal to ¾. Thus, in an implementation where 110 tones are employed for data transport (assuming one null tone), the maximum data rate can be expressed as follows:

$$\text{Max Data Rate} = \frac{110*4.5}{0.8+6.4} = \frac{495}{7.2us} = 68.75 \text{ Mbps}$$

assuming a guard interval, GI, equal to 0.8 us. Compared to 54 Mbps, which would have been achieved with 48 tones in 20 MHz, the increase in the maximum data rate is 27%.

Figure 4:
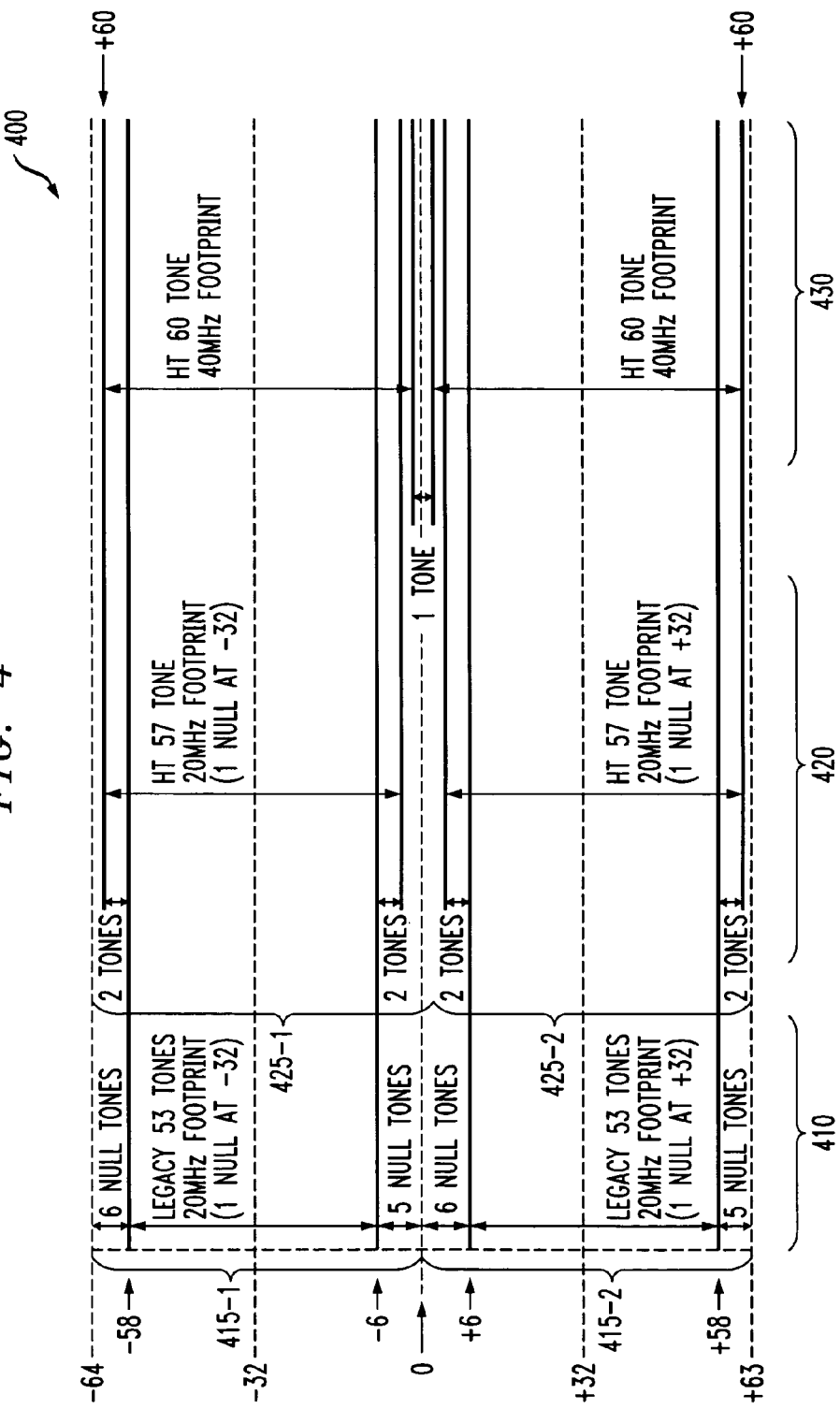
FIG. 4 illustrates a number of potential subcarrier designs 400 for 40 MHz.

FIG. 4 illustrates a number of potential subcarrier designs 400 for 40 MHz. As shown in FIG. 4, a first conventional subcarrier design 410 in accordance with the IEEE 802.11a standard that employs two independent adjacent 20 MHz channels 415-1 and 415-2. As discussed above in conjunction with FIG. 2, the legacy subcarrier design employs 52 subcarriers (i.e., tones) in each 20 MHz channel 415-1 and 415-2. There are six null tones on a first end of each 20 MHz channel and five null tones on the second end of each channel. Thus, there are 11 subcarriers separating each adjacent channel.

A second subcarrier design 420 in accordance with the proposed IEEE 802.11n standard provides a 40 MHz design that employs two independent adjacent 20 MHz channels 425-1 and 425-2. The proposed 802.11n design 420 employs 56 subcarriers in each 20 MHz channel. The proposed 802.11n design 420 recaptures two additional subcarriers on each side of each channel. The proposed 802.11n design 420 employs tones −60 through +60, with 7 null tones near DC, for a total of 112 used tones. There are thus four null tones on a first end of each 20 MHz channel and three null tones on the second end of each channel. There are seven subcarriers separating each adjacent channel in the 802.11n proposal.

According to another aspect of the invention, a subcarrier design 430 is provided for 40 MHz. As shown in FIG. 4, the 40 MHz subcarrier design 430 also spans from tones −60 through +60, providing an extra four tones on the outer edges of the band. In addition, the present invention reclaims three additional tones near DC that were kept null in design 420. The high throughput (HT) 20 MHz tone format has only 1 DC null. Thus, the total tone expansion provided by the present invention is eight, bringing the total number of data tones to 114, and the total number of used tones to 120. It is noted that this leaves seven tones in the transition band between adjacent 40 MHz channels. This separation is identical to that between two adjacent 20 MHz channels. However, the Q factor of the filter has doubled.

Figure 5:
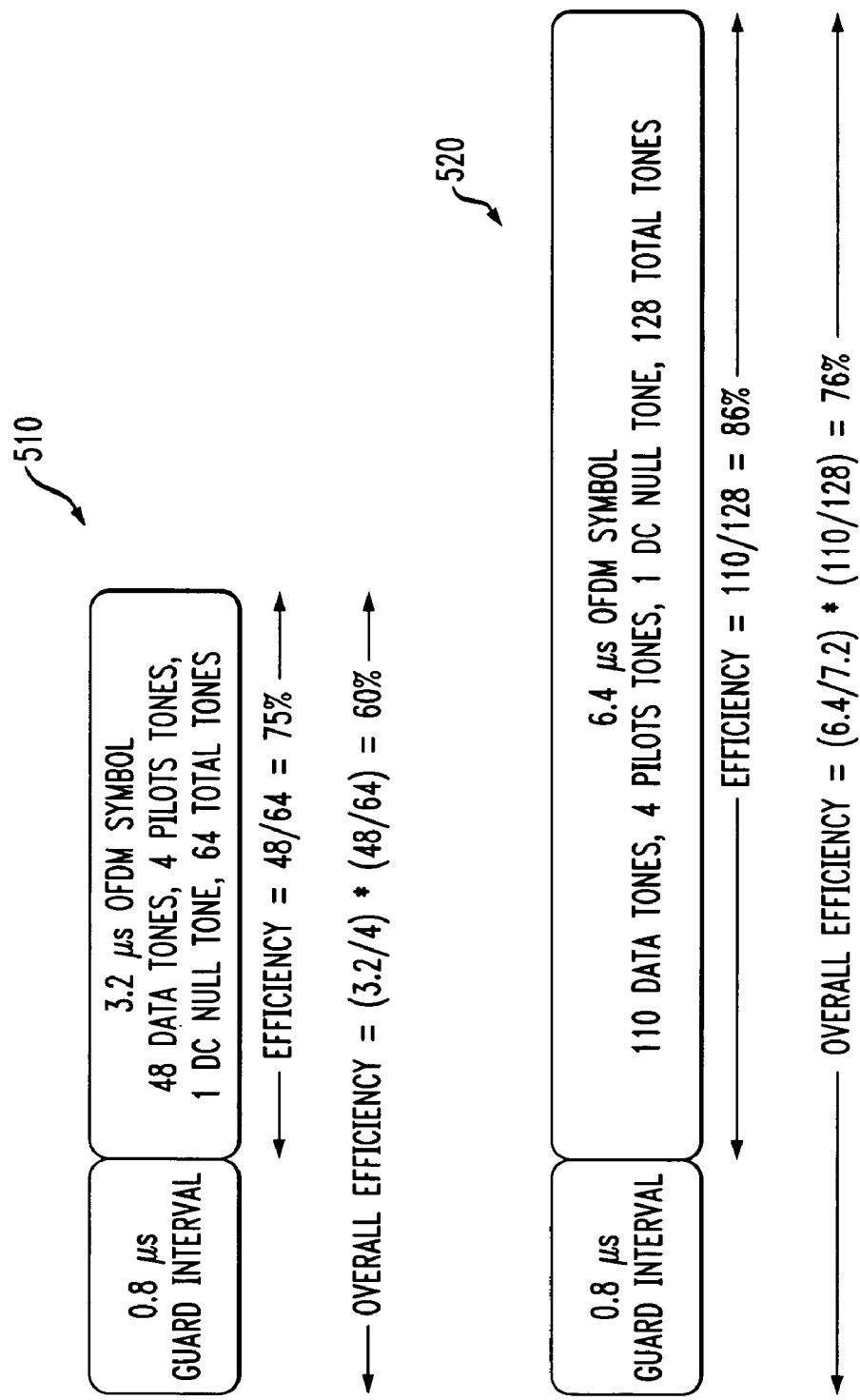
FIG. 5 evaluates the efficiency of a 64 point FFT and a 128 point FFT in 20 MHz.

FIG. 5 evaluates the efficiency of a 64 point FFT and a 128 point FFT in 20 MHz. As shown in FIG. 5, a 64 point FFT 510 demonstrates an overall efficiency of 60% and a 128 point FFT 520 demonstrates an overall efficiency of 76%.

While the present invention has been illustrated in the context of a 128 point FFT employed in each 20 MHz channel 310, the present invention can be extended to a 256 point FFT, as would be apparent to a person of ordinary skill in the art, based on the present disclosure. In a 256 point FFT implementation, the spectrum is sampled at four times the rate of the configuration shown in FIG. 2 (64 point FFT).

It is to be understood that the embodiments and variations shown and described herein are merely illustrative of the principles of this invention and that various modifications may be implemented by those skilled in the art without departing from the scope and spirit of the invention.

I claim:

1. A method for transmitting data in a multiple antenna communication system, wherein said multiple antenna communication system communicates with at least one legacy system employing an $N_1$ point fast Fourier transform (FFT) within a bandwidth, $BW_1$, said method comprising:

employing an $N_2$ point inverse FFT within said bandwidth, $BW_1$, wherein $N_2$ is greater than $N_1$; and employing subcarriers associated with said $N_2$ point inverse FFT to transmit said data.

2. The method of claim 1, wherein additional subcarriers are employed at outer edges of said bandwidth, $BW_1$, relative to said legacy system.

3. The method of claim 1, wherein said subcarriers associated with said $N_2$ point inverse FFT include additional subcarriers near DC relative to said legacy system.

4. The method of claim 1, wherein $N_1$ is a 64 point inverse FFT within said bandwidth, $BW_1$, equal to 20 MHz, and $N_2$ is a 128 point inverse FFT within said bandwidth, $BW_1$.

5. The method of claim 1, wherein said legacy system employs a total number of populated subcarriers $N_{pop_1}$, said method further comprising the step of employing a total number of populated subcarriers $N_{pop_2}$, where $N_{pop_2}$ is greater than $N_{pop_2}$.

6. The method of claim 1, wherein said legacy system employs a number of pilot subcarriers $N_{pilot_1}$, said method further comprises the step of employing a number of pilot subcarriers $N_{pilot_2}$, where $N_{pilot_2}$ is equal to $N_{pilot_1}$.

7. A transmitter that transmits data in a multiple antenna communication system, wherein said multiple antenna communication system communicates with at least one legacy system employing an $N_1$ point fast Fourier transform (FFT) within a bandwidth, $BW_1$, said transmitter comprising:
    an $N_2$ point inverse FFT operating within said bandwidth, $BW_1$, wherein $N_2$ is greater than $N_1$, wherein subcarriers associated with said $N_2$ point inverse FFT are employed to transmit said data.

8. The transmitter of claim 7, wherein additional subcarriers are employed at outer edges of said bandwidth, $BW_1$, relative to said legacy system.

9. The transmitter of claim 7, wherein said subcarriers associated with said $N_2$ point inverse FFT include additional subcarriers near DC relative to said legacy system.

10. The transmitter of claim 7, wherein $N_1$ is a 64 point inverse FFT within said bandwidth, $BW_1$, equal to 20 MHz, and $N_2$ is a 128 point inverse FFT within said bandwidth, $BW_1$.

11. A method for transmitting data in a multiple antenna communication system, wherein said multiple antenna communication system communicates with at least one legacy system employing an $N_1$ point fast Fourier transform (FFT) within a bandwidth, $BW_1$, said method comprising:
    employing an $N_2$ point inverse FFT within a bandwidth, $BW_2$, wherein $N_2$ is greater than $N_1$ and said bandwidth, $BW_2$, is greater than said bandwidth, $BW_1$; and
    employing subcarriers associated with said $N_2$ point inverse FFT to transmit said data, wherein said employed subcarriers includes one or more additional subcarriers at outer edges of said bandwidth, $BW_1$, relative to said legacy system and one or more additional subcarriers near DC relative to said legacy system.

12. The method of claim 11, wherein $N_1$ is a 64 point inverse FFT within said bandwidth, $BW_1$, equal to 20 MHz, and $N_2$ is a 128 point inverse FFT within said bandwidth, $BW_2$, equal to 40 MHz.

13. The method of claim 11, wherein said legacy system employs a total number of populated subcarriers $N_{pop_1}$, said method further comprising the step of employing a total number of populated subcarriers $N_{pop_2}$, where $N_{pop_2}$ is greater than $N_{pop_1}$.

14. A method for receiving data in a multiple antenna communication system, wherein said multiple antenna communication system communicates with at least one legacy system employing an $N_1$ point fast Fourier transform (FFT) within a bandwidth, $BW_1$, said method comprising:
    employing an $N_2$ point inverse FFT within said bandwidth, $BW_1$, wherein $N_2$ is greater than $N_1$; and
    employing subcarriers associated with said $N_2$ point inverse FFT to receive said data.

15. The method of claim 14, wherein additional subcarriers are employed at outer edges of said bandwidth, $BW_1$, relative to said legacy system.

16. The method of claim 14, wherein said subcarriers associated with said $N_2$ point inverse FFT include additional subcarriers near DC relative to said legacy system.

17. The method of claim 14, wherein $N_1$ is a 64 point inverse FFT within said bandwidth, $BW_1$, equal to 20 MHz, and $N_2$ is a 128 point inverse FFT within said bandwidth, $BW_1$.

18. A method for receiving data in a multiple antenna communication system, wherein said multiple antenna communication system communicates with at least one legacy system employing an $N_1$ point fast Fourier transform (FFT) within a bandwidth, $BW_1$, said method comprising:
    employing an $N_2$ point inverse FFT within a bandwidth, $BW_2$, wherein $N_2$ is greater than $N_1$ and said bandwidth, $BW_2$, is greater than said bandwidth, $BW_1$; and
    employing subcarriers associated with said $N_2$ point inverse FFT to receive said data, wherein said employed subcarriers includes one or more additional subcarriers at outer edges of said bandwidth, $BW_1$, relative to said legacy system and one or more additional subcarriers near DC relative to said legacy system.

19. The method of claim 18, wherein $N_1$ is a 64 point inverse FFT within said bandwidth, $BW_1$, equal to 20 MHz, and $N_2$ is a 128 point inverse FFT within said bandwidth, $BW_2$, equal to 40 MHz.

20. The method of claim 18, wherein said legacy system employs a total number of populated subcarriers $N_{pop_1}$, said method further comprising the step of employing a total number of populated subcarriers $N_{pop_2}$, where $N_{pop_2}$ is greater than $N_{pop_1}$.

* * * * *